Patented June 21, 1949

2,474,089

UNITED STATES PATENT OFFICE 2,474,089

PRODUCTION OF AMMONIA SALTS OF MALEIC ACID

Boyce G. Carson, Woodstown, N. J., assignor to E. I. du Pont de Nemours & Company, Wilmington, Del., a corporation of Delaware No Drawing. Application September 18, 1946, Serial No. 697,824

8 Claims. (Cl. 260—537)

This invention relates to processes for manufacturing ammonium salts of maleic acid, and especially to processes for manufacturing such salts in a form in which they are non-hygroscopic and in which the use of solvents is eliminated.

Non-hygroscopic di-ammonium maleate made by gassing an ethereal solution of maleic acid with ammonia is known (Keiser & McMasters, Amer. Chem. Jr. 49, 85). Both the di- and mono-ammonium maleate in an extremely hygroscopic form are known. The latter hygroscopic products were prepared by processes which include the passing of ammonia into a reaction medium comprising water as mutual solvent for maleic acid and ammonia (Büchner, Liebig's Annalen der Chemie, 49, 68; Weiss and Downs, American Chemical Society Journal, 45, 2341–9). These prior art processes leave much to be desired in that those which employ water do not produce a non-hygroscopic product and the one which produces a desired non-hygroscopic type of product employs a costly, highly volatile and dangerous solvent which is difficult to handle in manufacturing operations. Where the evaporation of solvent and drying are involved, costly operations and decomposition of the maleate takes place. Aqueous methods produce some maleimides which are removable only with great difficulty.

It is among the objects of the present invention to provide new processes for producing non-hygroscopic ammonium maleates. Another object is to provide such processes which do not involve the use of volatile solvents or water and which do not necessarily involve the use of a drying oven for the final preparation of the product. Other objects of the invention will be apparent from the following description.

The objects of the invention are attained in general by placing subdivided maleic acid in a closed container, preferably equipped with an agitator. Gaseous ammonia derived by volatilization of liquid ammonia is passed into the container. The temperature is maintained below the decomposition temperature of the product desired and gassing is continued until the water solution of a test portion produces no color change on Congo red paper. At this point, the product is the mono-ammonium salt. Further gassing produces the di-ammonium salt. The products are non-hygroscopic.

The following example is illustrative of the invention but it is to be understood that variations in the conditions of the process, such as temperature, pressure, time of gassing and degree of fineness of the solid reactant can be made without departing from the invention.

Example

Three hundred grams of maleic acid pulverized under ordinary atmospheric conditions to pass a screen of 100 meshes per inch were placed in a rotary steel container which was mounted to rotate on horizontal trunnions. Access to the container was provided through an axial opening in one of the horizontal trunnions. Gaseous ammonia derived by volatilization from a cylinder of liquid ammonia was passed into the container through a thin steel tube inserted through the opening in the trunnion. The temperature of the reaction mass at the start was about 25° C. The temperature rose to about 60° C. during the process but no attempt was made to keep the temperature constant. After 150 grams of ammonia had been passed into the container, a test portion of the contents was removed. When dissolved in water it was neutral to Congo red paper and faintly acid to litmus paper. The product weighing 355 grams was removed from the container and left in open trays until the unreacted ammonia had escaped. Analysis showed it to contain 12.64% nitrogen and 34.42% carbon, indicating 1.26 atoms of nitrogen per mole of maleic acid or a mixture of mono- and di-ammonium maleate. The product was non-hygroscopic and was found to be suitable for use where a non-hygroscopic mixture of mono-ammonium maleate and di-ammonium maleate was essential.

This product was converted to an essentially pure non-hygroscopic mono-ammonium maleate by grinding it with an amount of maleic acid calculated from the above analysis to constitute equi-molecular proportions of maleic acid and ammonia radicals.

The reaction is conveniently carried out at any temperature from about 20° C. to about the temperature where subdivided maleic acid forms agglomerates. Such temperatures give satisfactorily rapid and complete reactions. The particle size of the maleic acid influences the speed of the reaction and the completeness thereof in unit time, the finer particles being suitable for more rapid and complete reactions in unit time. Maleic acid subdivided to pass a screen of about 100 to about 325 meshes per inch is desired for the best results. Other conditions being equal, larger proportions of di-ammonium maleate are produced with longer contact of the reactants.

The present invention provides economical, convenient and safe processes for the manufacture of dry non-hygroscopic ammonium maleates. The desired products are not contaminated with undesirable reaction products such as maleimides, and the use of after-processes such as evaporation and drying are avoided.

From the foregoing disclosure it will be recognized that the invention is susceptible of modification without departing from the spirit and scope thereof and it is to be understood that the invention is not restricted to the specific illustrations thereof herein set forth.

I claim:

1. The process of manufacturing ammonium salts of maleic acid which comprises agitating a subdivided mass of solid maleic acid, maintaining the temperature of the mass below the temperature where subdivided maleic acid agglomerates, and passing ammonia gas derived by volatilization of liquid ammonia into contact with the maleic acid until non-hygroscopic ammonium salt of said acid is formed.

2. The process in accordance with claim 1 in which the proportion of maleic acid to ammonia is about 300 to 150 and the ammonia is passed into the maleic acid until a water solution of a sample of the reaction mass shows a neutral reaction to Congo red paper and a faintly acid reaction to litmus paper.

3. The process of manufacturing mono-ammonium maleate which comprises agitating a subdivided mass of solid maleic acid, passing ammonia gas derived by volatilization of liquid ammonia in contact with said subdivided material, providing for the maleic acid and ammonia to react in the range of temperature from about 20° C. to about the temperature that subdivided maleic acid agglomerates, said reaction being carried out until a water solution of a sample of the reaction mass shows a neutral reaction to Congo red paper and a faintly acid reaction to litmus paper, adding an amount of maleic acid to the reaction mass giving a ratio of nitrogen and carbon in the mixture corresponding to equimolecular proportions of ammonia and maleic acid radicals, and then grinding the mixture.

4. In the manufacture of non-hygroscopic ammonium salts of maleic acid the method of reacting ammonia with maleic acid which comprises mixing ammonia gas derived by volatilization of liquid ammonia with finely divided particles of solid maleic acid and providing for reaction between the ammonia and the maleic acid to take place at temperatures within the range from about 20° C. up to but not including temperatures at which the particles of maleic acid form agglomerates and below the decomposition temperatures of the ammonium salts of maleic acid produced.

5. The process of manufacturing non-hygroscopic ammonium salts of maleic acid which comprises agitating finely divided particles of solid maleic acid in the presence of ammonia gas derived by volatilization of liquid ammonia, providing for reaction between said maleic acid and said ammonia to take place at temperatures within the range from about 20° C. up to but not including temperatures at which said particles of maleic acid form agglomerates and below the decomposition temperatures of the ammonium salts of maleic acid produced, continuing to agitate said maleic acid in the presence of ammonia gas until substantially all of said maleic acid has reacted with ammonia to form ammonium salts, and separating unreacted ammonia gas from the non-hygroscopic ammonium salts of maleic acid produced.

6. The process of manufacturing non-hygroscopic ammonium salts of maleic acid which comprises charging a closed container with solid maleic acid which has been pulverized to pass a screen of about 100 meshes per inch, introducing sufficient ammonia gas derived by volatilization of liquid ammonia into said container to react with and convert said maleic acid to ammonium salts, providing for reaction between said maleic acid and said ammonia to take place at temperatures within the range from about 20° C. up to about 60° C., removing the non-hygroscopic ammonium salts of maleic acid produced from said container, and separating unreacted ammonia gas from said salts.

7. The process of manufacturing non-hygroscopic ammonium salts of maleic acid which comprises charging a closed container with about 2 parts by weight of solid maleic acid which has been pulverized to pass a screen of about 100 meshes per inch, introducing about 1 part by weight of ammonia gas derived by volatilization of liquid ammonia into said container to react with and convert said maleic acid to ammonium salts, providing for reaction between said maleic acid and said ammonia to take place at temperatures of about 25° to 60° C., removing a reaction mixture of mono-ammonium maleate and di-ammonium maleate from said container, and separating unreacted ammonia gas from said mixture.

8. The process of manufacturing non-hygroscopic mono-ammonium maleate which comprises agitating finely divided particles of solid maleic acid in the presence of an excess of ammonia gas derived by volatilization of liquid ammonia providing for reaction between said maleic acid and said ammonia to take place at temperatures of about 25° to 60° C., separating a reaction mixture of mono-ammonium maleate and di-ammonium maleate from unreacted ammonia gas, and grinding said mixture with an amount of maleic acid giving equimolecular proportions of maleic acid radicals and ammonia radicals.

BOYCE G. CARSON.

REFERENCES CITED

The following references are of record in the file of this patent:

UNITED STATES PATENTS

| Number | Name | Date |
| --- | --- | --- |
| 2,194,082 | Booth | Mar. 19, 1940 |
| 2,212,847 | Porter | Aug. 27, 1940 |

OTHER REFERENCES

Buchner, Liebig's Annalen der Chemie, vol. 49, p. 68 (1844).

Keiser et al., American Chemical Journal, vol. 49, p. 85 (1913).

Weiss et al., J. Amer. Chem. Soc., vol. 45, pp. 2341–2349 (1923).

McPherson et al., "Course in General Chemistry," Gunn & Co., 4th ed., 1936, p. 546.

Deniges, Chem. Abstract, vol. 40, page 6813 (1946).